United States Patent [19]

Lebas et al.

[11] Patent Number: 4,467,768

[45] Date of Patent: Aug. 28, 1984

[54] ELECTRONIC FUEL INJECTION DEVICE FOR AN INTERNAL COMBUSTION ENGINE

[75] Inventors: Denis M. P. P. Lebas, Grand Couronne; Jean B. G. H. Leprince, Louviers; Michel Touly, Amfreville la Campagne, all of France

[73] Assignee: Shell Internationale Research Maatschappij B.V., The Hague, Netherlands

[21] Appl. No.: 346,875

[22] Filed: Feb. 8, 1982

[30] Foreign Application Priority Data

Feb. 9, 1981 [FR] France .............................. 81 02486

[51] Int. Cl.³ .......................... F02B 3/00; F02B 33/00
[52] U.S. Cl. .................................. 123/472; 123/276; 123/278; 123/468; 123/470
[58] Field of Search ............... 123/468, 470, 472, 478, 123/276 C

[56] References Cited

U.S. PATENT DOCUMENTS

3,810,448  5/1974  Ford ................................... 123/478
3,845,748  11/1974  Eisenberg ........................... 123/468
3,930,483  1/1976  Blisko ................................. 123/468

Primary Examiner—Ronald B. Cox
Attorney, Agent, or Firm—Pravel, Gambrell, Hewitt, Kirk & Kimball

[57] ABSTRACT

The device comprises a control system (100) commanded by sensing means consisting of at least one optic fibre transmitting a radiation to at least one radiation detector, said sensing means co-operating with a rotating element driven by the engine, which consecutively intercepts the receipt of the radiation. The control system (100) determines the beginning and duration of injection at the injectors (11) incorporated in the fuel-transfer circuit (10), which circuit comprises two pipes, namely a fuel inlet pipe (19) and a fuel outlet pipe (20) which are interconnected and in heat exchange relation and are located at the back of each injector in order to obtain a closed transfer circuit and to ensure continuous circulation of fuel at the back of each injector, thus avoiding in-line vaporization of said fuel.

23 Claims, 11 Drawing Figures

ELECTRONIC FUEL INJECTION DEVICE FOR AN INTERNAL COMBUSTION ENGINE

The present invention relates to an electronic injection device for volatile fuels, such as liquefied petroleum gases, for internal combustion engines.

In view of the energy crisis, attempts have been made to feed internal combustion engines with liquefied petroleum gases.

It was at first considered carrying out said feeding by conventional carburation. Such a method, however, cannot be used for liquefied petroleum gases, since use of the latter raises very specific problems. On the one hand genuine gas carburettors designed to meet present ecological and economic requirements are currently not commercially available, on the other hand the reduction of the volumetric efficiency caused by the use of liquefied petroleum gases in conventional carburation involves a very substantial loss of engine power.

Attempts have been made to proceed to the indirect injection of liquefied petroleum gases in the liquid phase; this solution enables the charging of the cylinders to be considerably improved, while the engine then recovers its full power and accelerating ability.

Electronic injection devices are already known of the type comprising a control system determining the beginning and duration of injection aligned with injectors incorporated in the fuel transfer system, which control system is activated by sensing means co-operating with a rotating element driven by the engine and by at least one sensing means representing the air flow in the intake pipe, in order to make the beginning and duration of injection dependent on the position of the moving parts, the rotational speed of the engine and on the air intake.

Previous devices of said type, which have been designed for the injection of gasoline, are very poorly suited for injecting volatile fuels in the liquid state, such as liquefied petroleum gases. The injection of liquefied petroleum gases in fact raises very specific problems mainly resulting from the fact that it is necessary to avoid vaporization after expansion in the intake manifold and, consequently, to determine the beginning and duration of said injection with a high degree of precision.

When use is made of fuel such as gasoline, the parameters determining the beginning and duration of the injection are not critical; the fuel can be injected behind the intake valve, before the intake moment of the corresponding cylinder and the mixture then remains available until the intake valve is opened.

Liquefied petroleum gases, however, cannot be stored in this manner behind the intake valves. During operation of the engine, liquefied petroleum gases, in fact, vaporize rapidly at the internal temperature and pressure of the intake manifold and this renders any storage of the mixture impossible.

Other devices have been designed more particularly for the injection of liquefied petroleum gases for internal combustion engines. Said devices, however, are not entirely satisfactory in respect of the determination of the injection time and are very sensitive to the interferences caused by the neighbouring high voltage required for ignition; moreover, said previous devices do not solve the problems of in-line vaporization of the fuel.

The present invention solves the various problems mentioned above by proposing a novel electronic injection device for fuel, especially liquefied petroleum gases, for internal combustion engines, which device is commanded by a control system of the above-mentioned type is especially characterized by the precision of its control system and the regularity and reliability of its feeding function.

The device according to the present invention is characterized in that the fuel transfer system comprises two pipes, one a fuel inlet pipe and the other a fuel outlet pipe, which are interconnected and in heat exchange relation, which pipes are located at the back of each injector in order to form a closed transfer loop and to ensure continuous circulation of fuel at the back of each injector, thus avoiding in-line vaporization of said fuel.

According to an advantageous embodiment of the invention, the sensing means co-operating with a rotating element driven by the engine, in order to detect the position of the moving parts and the rotational speed of the engine, consist of at least one optic fibre transmitting radiation to at least one radiation detector and a device made integral with the rotating element driven by the engine, which device consecutively interrupts the receipt of the radiation by each detector.

According to another advantageous embodiment of the invention, the sensing means representing the air intake consists of a sensor responding to the absolute pressure prevailing in the inlet pipe.

The invention will now be described by way of example in more detail with reference to the accompanying drawings, in which.

The electronic injection device of the present invention shown in FIG. 1 comprises a fuel transfer circuit with the general reference numeral 10, in which are incorporated injectors 11 of which the duration of injection is determined by a control system 100, as described in more detail below.

The injectors 11 are conventional solenoid injectors comprising a needle which forms an integral part of a magnetic armature. In rest position, a return spring holds the needle on its seat. The assembly is contained in an injector body also comprising a magnetic coil. When this coil is energized by an electric current supplied by the control system, the armature of the injector is attracted, the needle is lifted and injection takes place.

Since the injector is fed under constant pressure, the quantity of fuel injected is proportional to the time the needle is in the open position, that is to the time when the electromagnet receives power from the control system.

According to a characteristic of the invention, each injector 11 is arranged in such a manner that the fuel is injected countercurrently to the air stream, which arrangement gives a more homogeneous mixture than injection of the conventional type in which the fuel is injected in the same direction as the air stream.

Figure 1:
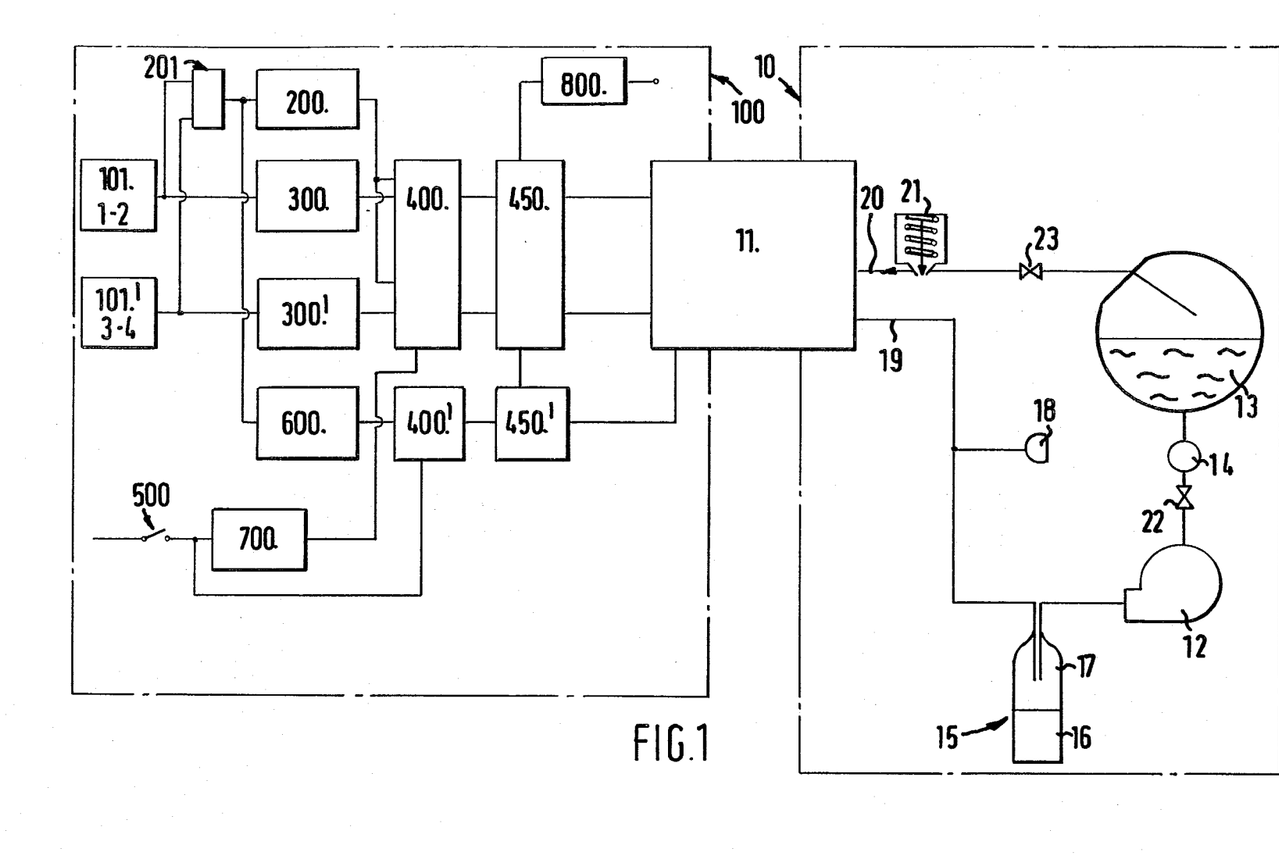
FIG. 1 represents a diagrammatic view of the fuel transfer circuit and of the control system, which form the electronic injection device of the present invention.

According to the injection device of the present invention, the injectors 11 are arranged in parallel in a closed fuel transfer circuit 10 as shown in FIG. 1. The fuel transfer circuit closed in this manner makes it possible to ensure continuous circulation of fuel at the back of the injector bodies 11 and to avoid an excessive rise in the fuel temperature when the engine is operating. Said injectors 11 are fed by a pump 12 which raises the fuel into a reservoir 13 via a conventional flow limiter 14.

In order to ensure that the fuel transfer circuit forms a closed loop, it comprises two pipes which are interconnected and in heat exchange relation. This fuel inlet pipe 19 and fuel outlet pipe 20 are advantageously coaxial and concentric and connected to the back of each injector body as will be described in more detail below.

The inlet pipe 19 is connected to the discharge end of the pump 12 via a hydropneumatic accumulator 15 serving to supply fuel under constant pressure to the injector nozzles. The pump 12, which serves to ensure that the fuel flow required for proper operation of the engine is delivered, operates in an alternating manner which can be compared to a pulsating sinusoidal movement. Such a pulsating movement results in charge losses that are likewise of a pulsating nature and in a nonconstant fuel pressure at the injectors.

The hydropneumatic accumulator 15 conventionally comprises two chambers 16, 17 separated by a diaphragm. Chamber 16 is filled with nitrogen at a pressure which is a function of the discharge pressure of the pipe the fuel pressure of which must be regulated; the other chamber 17 serves as buffer reservoir in order to equalize the pulsating nature of the fuel supply pressure. A pressure gauge 18 is advantageously inserted between the hydropneumatic accumulator 15 and the injectors 11 for checking the pressure of the fuel supplied to them.

The fuel outlet pipe 20 is connected to the reservoir 13 via a safety valve 21. This safety valve 21 enables the fuel supply pressure to be controlled. Solenoid valves 22 and 23 are advantageously located in the fuel outlet pipe 20 and fuel inlet pipe 19 of the reservoir 13, in order to check the fuel flow.

Figure 2:
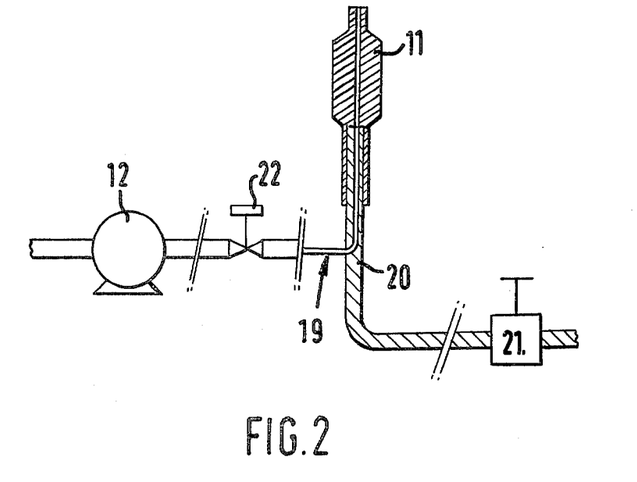
FIGS. 2 and 3 represent two embodiments of the feeding system of the injectors.

According to the embodiment of the feeding system of the injectors shown in FIG. 2, the fuel inlet pipe 19 of the injectors, which is connected at the back of the body of each injector 11, as shown diagrammatically, is conneced to the pump 12 via the solenoid valve 22. The inlet pipe 19 penetrates inside the injector body 11 and the outlet pipe 20, which is concentric and co-axial with the inlet pipe 19, surrounds the latter and terminates at the back of the injector body 11. As already stated, said fuel outlet pipe 20 is connected to a safety valve 21 which serves as pressure regulator.

Figure 3:
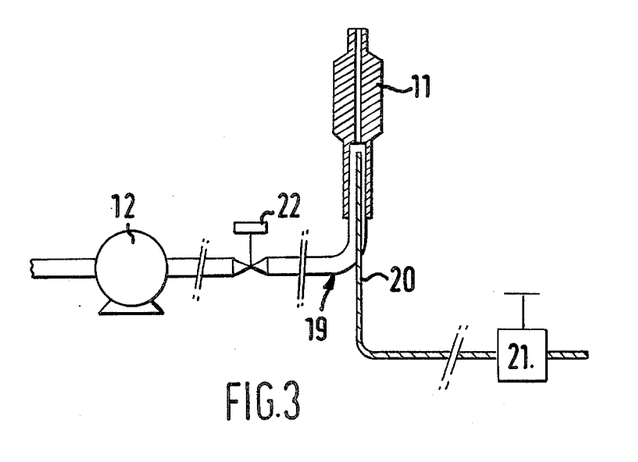

According to the embodiment of the injector feeding system shown in FIG. 3 the fuel inlet pipe 19 terminates at the back of the body of the injector 11 and surrounds the central outlet pipe 20 which penetrates far inside the body of the injector 11.

It is therefore obvious that the total fuel flow from the pump is conducted via the back of the injector body through the inlet pipe 19. The quantity required for injection is admitted into the body of the injector and injected to the intake valves, the excess fuel being passed to the reservoir 13 through the outlet pipe 20 and safety valve 21. The flow of excess fuel through the outlet pipe 20 protects the liquefied petroleum gases coming from the pump 12 against the radiation of the engine. The fuel thus recycled via safety valve 21 can conveniently partly vaporize, thus acting as a kind of thermal safety device.

As already explained, the use of liquefied petroleum gases excludes any storage of fuel at the back of the intake valves.

It is therefore necessary to determine with a high degree of precision both the beginning and the duration of the injection of fuel to said intake valves in order to synchronize said injection with the moment of intake of the corresponding cylinder.

The moment and duration of said injection are determined by means of the control system having the general reference numeral 100, shown diagrammatically in FIG. 1. Said control system 100 in fact supplies impulses of current to the electromagnets of the injectors 11, causing displacement of the armatures and of the needles and, consequently, the injection of fuel.

The impulses of current supplied in said manner enable injection to be made, upstream of the intake valves, of a quantity of fuel proportional to the air flow and thereby a correctly dosed fuel mixture to be obtained.

Figure 4:
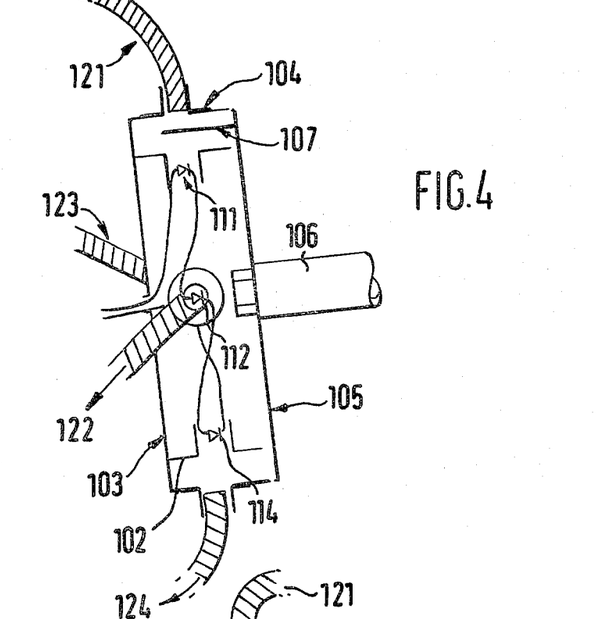
FIGS. 4 and 5 represent partial views of the sensing means co-operating with the rotational element driven by the engine, parallel and perpendicular to the driving shaft of the rotating element respectively.
Figure 5:
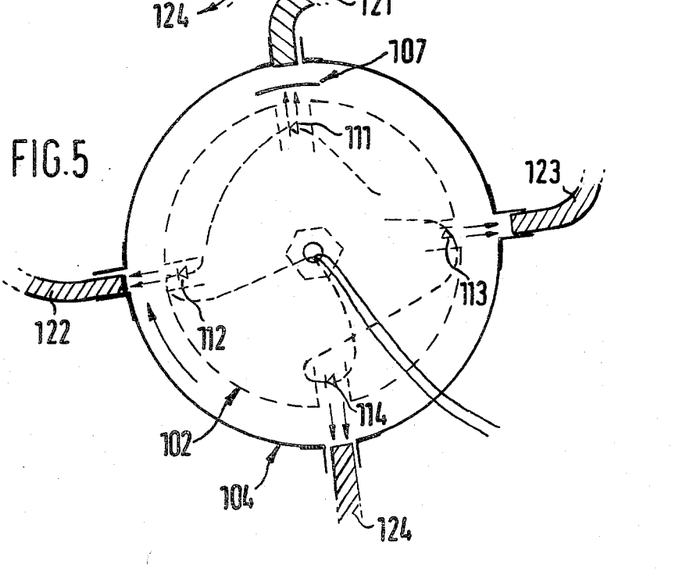

The beginning of the control system, which is diagrammatically shown in FIG. 1, consists of detecting circuits 101 comprising sensing means which co-operate with a rotating element driven by the engine, the embodiment of which is shown in FIGS. 4 and 5, and circuits for shaping the signal produced by said sensing means. Said device serves the purpose of detecting the position of the moving parts of the engine and the rotational speed thereof in order to synchronize the injection with the time of intake of each cylinder.

The signal shaped by the circuit 101 energizes in parallel a monostable 300 and a circuit 200 determining the duration of the injection impulse. The monostable 300 co-operates with a decoding circuit 400 which serves to determine which injector must be energized as a function of the position of said moving parts of the engine and of the intake time of each cylinder. To this end, each injector 11 is actuated by the decoding circuit 400 through a power circuit having the general reference numeral 450.

In certain particular cases, vehicle engines are equipped with common intake chambers for several cylinders, one for 1 and 2 and another for 3 and 4. It is then of no use to provide one injector per cylinder, one injector per intake chamber being sufficient.

In an embodiment of this type, the detecting and shaping circuit 101 includes the circuits corresponding to cylinders 1 and 2 in order to jointly activate the rest of the control system. A circuit 101', which is analogous to circuit 101, is provided for the cylinders 3 and 4.

This circuit 101' energizes a monostable 300', which is analogous to monostable 300; said monostable 300' also co-operates with the decoder 400.

Moreover, the outputs of the circuits 101 and 101' activate, via a logical "OR" gate 201, the circuit 200 which determines the duration of the injection impulse.

It is obvious, however, that the embodiment described in more detail below can conveniently be adapted for the event that it is necessary to provide 4 injectors instead of 2.

In such a case it will be sufficient to provide four identical detecting and shaping circuits analogous to circuit 101, which respectively energize a monostable analogous to monostable 300, each of the four monostables co-operating with the decoding circuit 400. The circuit 200 determining the duration of the injection impulse will then be energized by the output of a gate having four inputs performing the function "OR", each of said inputs being connected to the output of the corresponding detecting and shaping circuit.

On the other hand it has been found that, in the event of each intake chamber feeding two cylinders, it is difficult to balance the dosage of the various cylinders when the engine has slowed down, since the flow rate of the air stream is then very low. Part of the fuel destined for one cylinder may in fact penetrate into the adjoining cylinder. When the engine is fed in this manner, two of its cylinders are filled with a rich mixture, the other two cylinders receiving a lean mixture, which results in uneven operation of the engine.

In order to eliminate this drawback, a delay injector 11' is located upstream of the air choke. A change-over switch 500, responding to the command of the air choke, puts into operation either the injectors 11, referred to as main injectors below, or the delay injector 11'. To this end the change-over switch 500 controls on the one hand the first decoding circuit 400 and on the other hand a second decoding circuit 400' which co-operates with a power circuit 450' serving to energize the coil of the delay injector 11'.

The duration of injection by this delay injector 11' is determined by a circuit 600 which is connected between the output of the "OR" gate 201 and one of the inputs of the decoding circuit 400'.

The smooth passage from the injection by the main injectors 11 to that by the delay injector 11' requires the putting into operation of a delay circuit 700 which prolongs operation of the main injectors 11 for about one quarter of a second. This embodiment enables the buffer air between the valves and the delay injector 11' to be vented.

According to the charge and the conditions of use of a battery, the potential difference at the terminals of the latter can vary by several volts and it is therefore necessary to incorporate in the electronic control system 100 a regulated supply 800 providing the different voltages required to ensure correct and steady operation of the various electronic components, especially of the integrated circuits and of the injectors.

FIGS. 4 and 5 partly show the detector forming the sensing means co-operating with a rotating element driven by the engine.

Said detector advantageously comprises four light-emitting diodes 111, 112, 113 and 114, evenly arranged on the circumference of a cylinder 102 made integral with a fixed support 103, and corresponding to the cylinders 1, 2, 3 and 4, respectively. Said light-emitting diodes are arranged in series in the order 111, 113, 114, 112 or any variant of this order, and fed with a regulated 5-volt supply in order to ensure the conventional injection sequence of the cylinders 1, 3, 4, 2. Said four diodes emit radiation having a wave length within the infrared spectrum. An outer cylinder 104, concentric with the inner cylinder 102, is supported by the same fixed support 103 and comprises four connecting points for optic fibres 121, 122, 123, 124 the end of each being located opposite each of the four light-emitting diodes 111, 112, 113, 114. The radiation emitted by the light-emitting diodes is thus transmitted to a radiation detector such as a photo-transistor, photo-diode or a similar device.

A moving disc 105 co-operating with a rotating part driven by the engine, such as the camshaft 106, is provided with an interrupting tongue 107 which consecutively interrupts the transmission of the radiation by each optic fibre and, consequently, the receipt of the radiation by each detector. The radiation detector, such as the photo-transistor, is used intermittently, it being saturated when the corresponding optic fibre transmits the radiation and blocked when said tongue 107, which is integral with the moving disc 105, intercepts the radiation, which process takes place in rhythm with the rotation of the camshaft 106.

Each passage of the tongue 107 along the end of the optic fibre determines the starting reference of each injection and it is therefore obvious that the correct timing of the moving disc 105 carrying said tongue 107 enables the injection advance to be set and consequently the best operation of the engine to be achieved.

Said detecting technique, in which use is made of an optic fibre, is better able to withstand the substantial fluctuations in temperature and grants better protection against interference, especially from the adjacent high voltage necessary for ignition, than the inductive proximity detectors which are usually applied and consist of a transistor oscillator which is destabilized by a metallic screen crossing its detection field.

Figure 6:
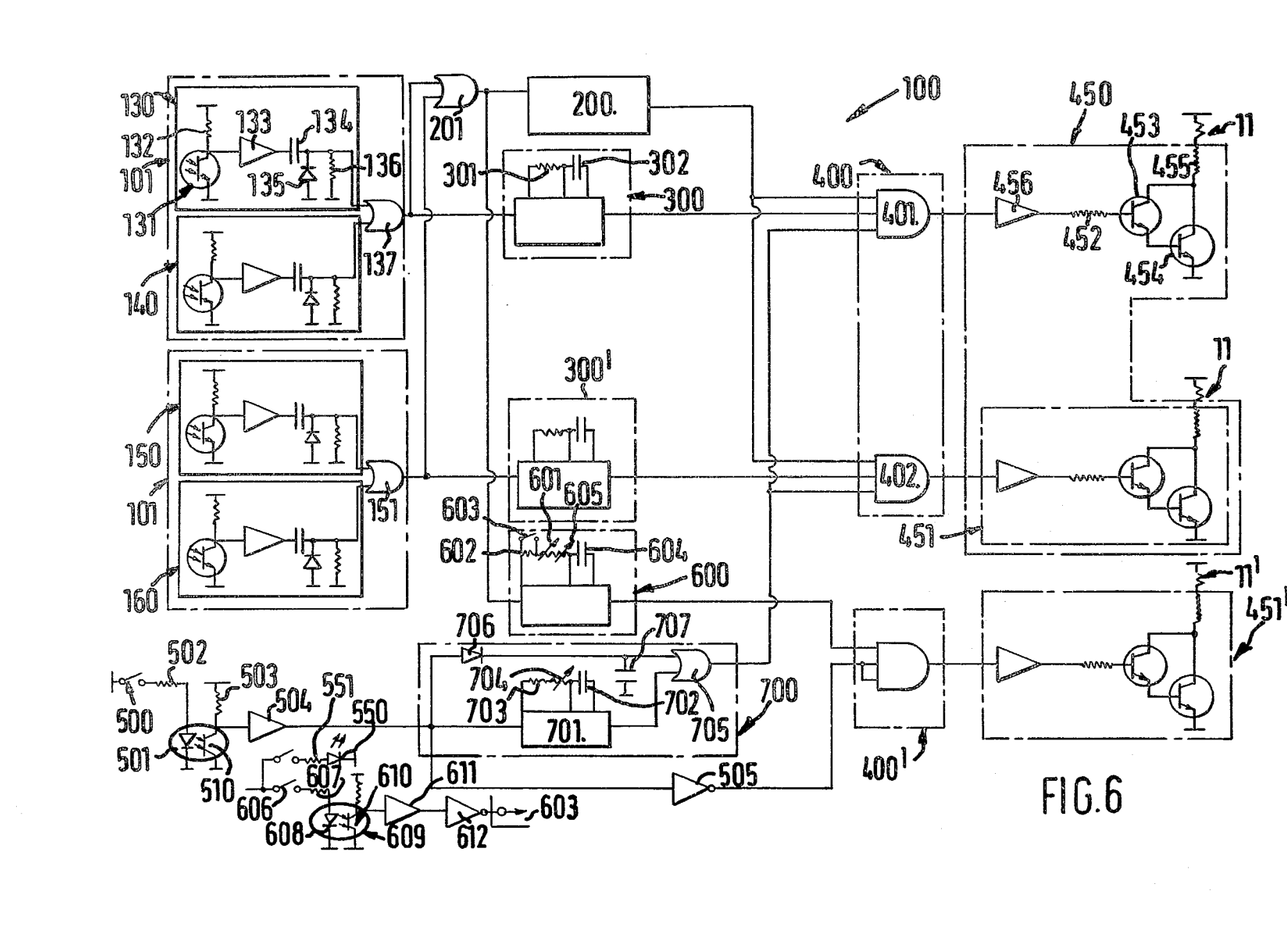
FIG. 6 represents schematically a detailed scheme of the circuits forming the electronic control system.

The embodiment and operation of the control system will now be further explained with reference to FIG. 6 which shows an example of an embodiment.

Each optic fibre 121, 122, 123, 124 transmits radiation to a photo-transistor which is the beginning of a circuit 130, 140, 150, 160 which produces pulses representing the position and the rotational speed of the camshaft. Only the circuit 130 will be further described, but it should be noted that circuits 140, 150 and 160 are similar.

Via a current-limiting resistor 132, the photo-transistor 131 is connected on one side to earth and on the other side to an 8-volt terminal.

At the photo-transistor, control pulses are thus obtained which are synchronized with the rotation of the camshaft and correspond alternately to the logical conditions "1" and "0" compatible with the logic circuit, corresponding to the blocked or saturated condition of the transistor.

In order to avoid untimely activation of the logic circuits by intermediate voltages, the pulses transmitted by the photo-transistor are first reshaped by a circuit consisting of a buffer amplifier 133, the output of which is connected to a filter network consisting of a capacitor 134 and a parallel assembly consisting of a diode 135 and a resistor 136, connected between earth and said capacitor.

As already stated, the detecting and shaping circuit 101 includes the detecting and shaping circuits corresponding to cylinders 1 and 2 and to this end the outputs of the two filter networks of the circuits 130 and 140 are connected to the two inputs of an "OR" gate 137.

The same applies to the detecting and shaping circuit 101', the outputs of the two filter networks of the circuits 150 and 160 being connected to the two inputs of an "OR" gate 151.

These two gates 137 and 151 consequently emit at their outputs, which are the outputs of the circuits 101 and 101', pulses corresponding respectively to the passage of the tongue 107 along the optic fibers 121 and 122 for gate 137, and 123 and 124 for gate 151.

The pulses thus supplied by gates 137 and 151 are transmitted to two monostables 300 and 300' respectively. The output of said monostables is connected to one of the three inputs of an "AND" gate. Said two gates 401, 402 form the decoding circuit 400. The "AND"gates 401 and 402 of the decoding circuit 400 only allow the passage of pulses that determine the duration of injection and come from circuit 200, if the output of the corresponding monostable 300, 300' is in the logical condition "1". If the output of the monostable is in the logical condition "0", the corresponding "AND" gate is blocked.

Consequently, the duration of the pulses of the monostables 300 and 300' must on the one hand exceed the highest possible value of the injection time, in order that the authorization of the passage has a longer duration than the injection time; on the other hand it must be shorter than the time separating two command pulses when the engine runs at full speed. The RC time constant of the monostable is determined by the choice of the values of a resistor 301 and of the capacitor 302 for the monostable 300, and of the same components for the monostable 300'.

When the driver releases the accelerator pedal, the delay switch 500, responding to operation of the air choke, is closed. A light-emitting diode 501 is then energized via a current-limiting resistor 502. The emission from said light-emitting diode saturates the corresponding photo-transistor 510 which is itself fed via a current-limiting resistor 503. The collector of the photo-transistor is connected to the input of a buffer amplifier 504, so that the input of the latter is in the logical condition "1" when the photo-transistor is blocked and passes into the logical condition "0" if the photo-transistor is saturated. The output of the buffer amplifier 504 is connected to the input of an inverter 505 the output of which commands two inputs of the "AND" gate 400', which gate serves as decoding circuit for the delay injector 11'. Its third input receives pulses from the monostable 600 which serves to determine the duration of the injection when the engine is running at reduced speed.

The duration of the pulse of the delay monostable can be controlled by means of two potentiometers 601 and 605 and by the value of a capacitor 604. Potentiometer 605, which has a high range, enables a rough setting of the richness of the mixture. Potentiometer 601, which has a lower range, makes fine setting possible. A resistor 602 arranged in series with said two potentiometers is normally short-circuited by a switch 603. Opening of the latter switch 603 is controlled by means of a switch 606, which is located in the cab and enables the driver to raise the value of the pulse and to enrich the mixture when the engine is cold, thus serving as starter. Said switch energizes, through a current-limiting resistor 607, the light-emitting diode 608 of the photo-transistor 609. The output of said diode saturates the corresponding transistor 610. Since the collector of the transistor 610 is connected to the input of a buffer amplifier 611, the input of the latter passes into the logical condition "0" when the transistor 609 is saturated by the output of the light-emitting diode 608. The output of said buffer amplifier 611, which is connected to the input of an inverter 612, is therefore also put in the logical condition "0" and causes the output of the inverter 612 to pass into the logical state "1", which inverter controls the opening of switch 603. The resistor 602 is now actuated and causes the mixture to be enriched by increasing the value of the injection pulse.

A light-emitting diode 550, which is energized via a current-limiting resistor 551 and is fitted on the dashboard, displays the putting into operation of the starter.

The output of the buffer amplifier 504, on the other hand, energizes the input of the delay circuit 700 which prolongs operation of the main injectors 11 for about half a second after the engine has slowed down.

This delay circuit 700 consists of a monostable 701, the time constant of which is determined by a capacitor 702 and a resistor 703 which is connected in series to an adjustable potentiometer 704 in order to control the duration of the delay. The output of the monostable 701 energizes one of the inputs of an "OR" gate 705, the other input of which is connected to the output of the buffer amplifier 504 via a diode 706. A filter capacitor 707 connects said second input to earth.

The delay operation system just described may in certain cases suffer from the disadvantage of not absorbing a possible variation in the volumetric efficiency of the cylinders, because the monostable 600 determining the duration of the delay injection pulse is not corrected for said efficiency. Now, the rotational speed of the engine running at reduced speed can for several reasons vary at the same opening of the throttle, for example when the dipped headlights are switched on. In the event of such an irregularity being clearly noticeable, the control of the delay circuit can easily be changed to put into operation the frequency/voltage transformer of the circuit 200 which will be described further below.

The third input of the "AND" gates 401 and 402 of the decoding circuit 400 is connected to the output of the "OR" gate 705.

During normal operation, the delay switch 500 is open, the output of the gate 705, which is in logical condition "1", opens the gates 401 and 402, the "AND" gate 400' for decoding at reduced speed being closed via the inverter 505, and the pulses of the monostables 300 and 300',which are synchronized with the movement of the tongue 107 past the optic fibre 121, 122, 123 and 124, allow pulses, determining the duration of injection by the main injectors 11, to pass from the circuit 200.

When the engine is operating at reduced speed, however, the switch 500 is closed, the output of the gate 705 passes into the logical condition "0" after the delay period determined by the monostable 701 and then blocks the "AND" gates 401 and 402. The output of the inverter 505 passes into the logical condition "1" and opens the "AND" gate 400', allowing the passage of the pulses coming from monostable 600.

The output of the "AND" gate 401 is connected to a converter 456 which energizes, via a resistor 452, a power circuit consisting of two compound-connected transistors 453, 454. The power transistor 454 becomes conductive when the "AND" gate 401 is open and receives pulses from circuit 200. The injector coil corresponding to cylinders 1 and 2, activated by transistors 453 and 454, is then energized via a resistor of some Ohms 455.

The outputs of "AND" gates 402 and 400' are connected to power circuits 451, 451' which are similar to the power circuit connected to the output of the "AND" gate 401. Said power circuits 451 and 451' energize the coil of the main injector 11 of cylinders 3 and 4 and the coil of the delay injector 11' respectively.

Figure 7:
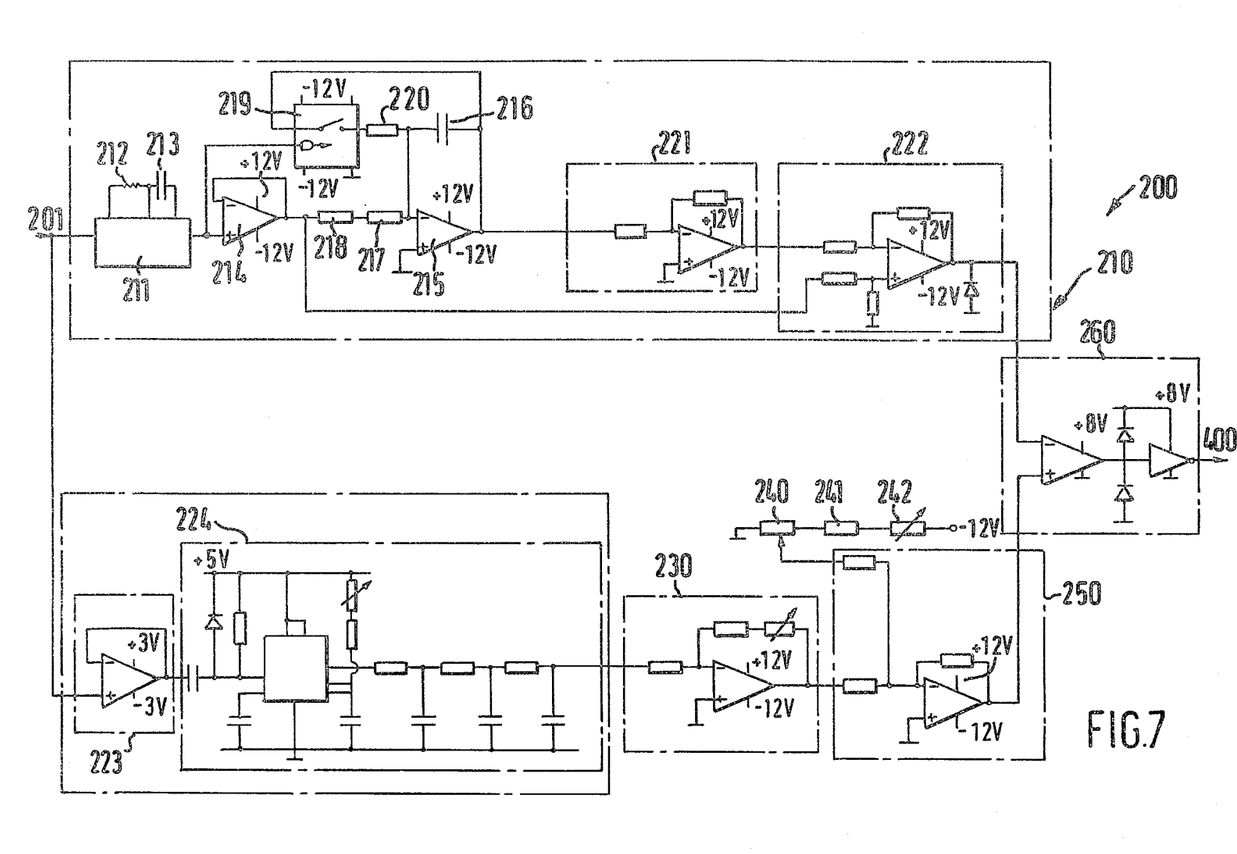
FIGS. 7 and 8 represent schematically two variants of a detailed scheme of the circuits determining the duration of the injection.

Below follows a more detailed description of the circuit 200 shown in FIG. 7, determining the duration of the activating pulses of the main injectors 11. These pulses must be determined in such a manner as to ensure a suitable supply of fuel and a proper ratio with the air flow. The basic principle for processing the activating pulse of the injectors resides in the comparison between a variable voltage level representing both the engine speed and the quantity of air supplied to the air choke and a fixed slope of integration.

In other words, for a given engine speed, stabilized and adjusted by the load, there is a predetermined air intake corresponding with each position of the throttle. A fuel intake, defined by the duration of the pulse applied to the injectors, must be matched with said predetermined air intake.

Said fixed slope of integration is generated by a circuit 210. This circuit 210 comprises a monostable 211 of which the switching duration is determined by the value of the resistor 212 and of the capacitor 213. Said monostable is controlled by the pulses supplied by the output of the "OR" gate 201 and the monostable energizes the non-reversible input of an operational amplifier 214 serving as impedance regulator, the output of said amplifier 214 being connected back to its reversible input. The available pulses at the output of the amplifier 214 are then passed to an operational amplifier 215 which acts as an integrator. The gradient of the negative slope obtained at the output of the amplifier 215 is determined by the capacitor 216 and by the assembly comprising resistor 217 and adjustable potentiometer 218.

A switch 219 controlled by the output pulse of the monostable 211 ensures that the integrator is reset to zero to short-circuiting the capacitor 216 via a weak resistor 220.

An inverter 221 with a gain of 1 connected to the output of the operational amplifier 215 restores a growing positive slope which is subsequently transmitted to the reversible input of a subtracting network 222.

The non-reversible input of said network 222 receives the output pulse of the impedance-adapting amplifier 214. Th output of said subtracting network 222 consequently supplies synchronized slopes of integration on top of the output pulses of the "OR" gate 201.

Each detection pulse from the "OR" gate 201 triggering the monostable 211 moreover penetrates an amplifier with a gain of 1, impedance adaptor 223, the output of which controls a conventional frequency-voltage converter 224. The output signal of said converter is therefore proportional to the rotational speed of the engine. Said signal is transmitted to an amplifier with adjustable gain 230.

A voltage dividing bridge consisting of a potentiometer 240 co-operating with the air choke and connected in series to a fixed resistor 241 and an adjustable resistor 242, supplies a voltage representing the air flow. Said voltage and that obtained at the output of the amplifier with adjustable gain 230 are applied to two inputs of an adding network 250 of which the output signal is compared in a comparator 260 with the slope of integration obtained at the output of the subtracting network 222. As long as the slope of integration has a value in excess of the output voltage of the adding network 250, the comparator 260 activates injection by the main injectors 11 via the decoder 400 and the power circuit 450. This injection stops when the slope of integration reaches said voltage. The blocking threshold of the comparator and consequently the duration of injection are therefore functions of the rotational speed of the engine and of the position of the choke, thus of the air intake.

Figure 9:
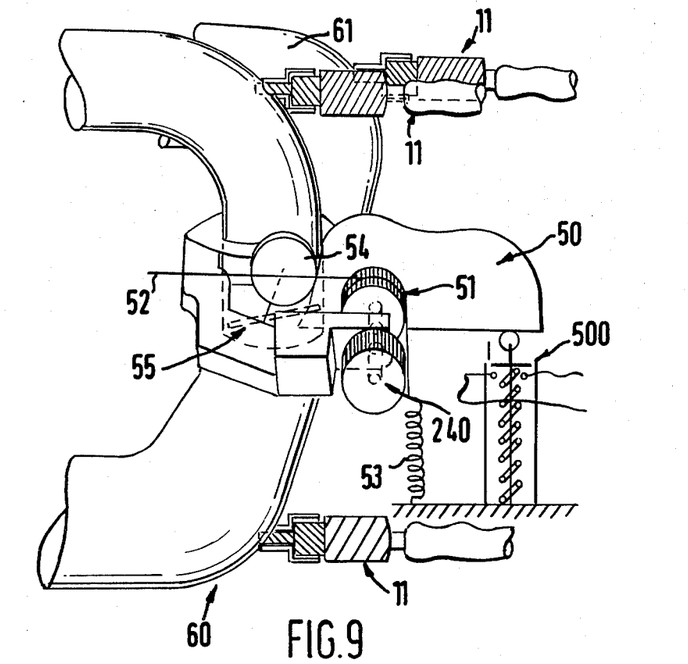
FIG. 9 represents a general scheme of the design of an intake pipe in an embodiment according to the invention.

FIG. 9 is a general schematic representation of the intake pipe of the engine. A cam 50 made integral with a drum 51, around which the accelerator cable 52, tensioned by the return spring 53, is wound, engages a roller 54 fitted on the spindle of the air choke or throttle 55. Said roller 54 makes a connection without perceptible friction possible. The rotating drum 51 moves round the cam 50 and the spindle of the circular-path potentiometer 240 performing the correction within the adding network 250, as described hereinbefore.

Moreover, the cam 50 co-operates with the delay switch 500. Two main injectors 11 each feed the intake pipes 60, 61, each pipe being for two different cylinders, the delay injector 11' being located upstream of the throttle 55.

The path of the cam 50 is determined for each type of engine and is obtained point by point on a dynamometer bench.

The embodiment, however, involves the use of sophisticated hardware and must be adapted to each type of engine; therefore, the present invention proposes a second method of controlling the duration of the injection in relation to the air intake.

Figure 8:
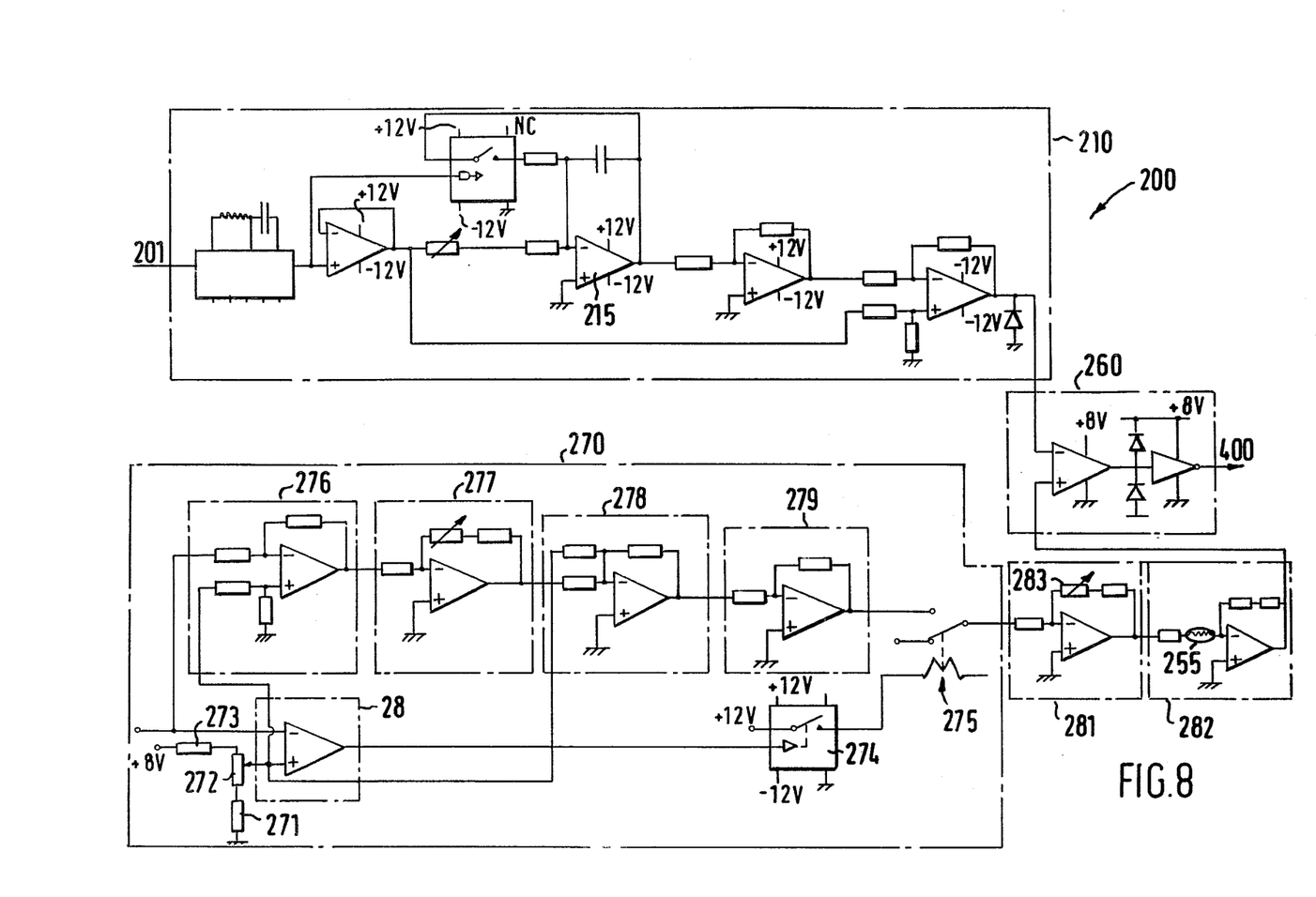

The principle of the circuit 200 shown in FIG. 8 which determines the duration of the injection, therefore comprises comparison of the slope of integration supplied by the slope generator 210 described hereinbefore, with the signal supplied by a sensing means measuring the absolute pressure prevailing in the intake manifold. The absolute pressure prevailing in the intake manifold, which is proportional to the quantity of air drawn in each cylinder, is therefore the parameter representing the volumetric efficiency of the engine.

The response curve of the commercially available sensing means is generally not linear and flattens out at certain pressure and it is therefore necessary to linearize the gradient of the signal coming from the sensing means before transmitting it to the comparator 260, by means of a circuit 270, which will now be described.

A comparator 280 receives at its non-reversible input a reference voltage corresponding to the voltage below which the response curve of the sensing means is linear. Said reference voltage is simply obtained by means of a resistance bridge dividing the voltage. The dividing bridge consists advantageously of two fixed resistors 271 and 273 and of a potentiometer 272 permitting control of said reference voltage.

The reversible input of the comparator 280 receives the output signal of the sensing means for the absolute pressure.

Thus, when the level of the output signal from said sensing means is lower than the reference voltage, the camparator 280 commands a switch 274, which transmits the output signal of the sensing means, via a relay 275, to the reversible input of an amplifier 281, the gain of which can be adjusted by means of an adjustable resistor 283 and which enables the response curve of the sensing means to be shifted.

The output of said amplifier 281 energizes the input of a second amplifier 282, the gain of which is changed by a thermistor 225 located in the intake manifold, and which causes a correction as a function of the air temperature. Said correction enables the air density to be allowed for. The output signal of said amplifier 282 energizes the non-reversible input of the comparator 260.

However, as soon as the output signal of the sensing means exceeds the reference voltage, the comparator 280 causes the position of the relay 275 to be changed via the switch 274, which change enables a corrected output signal from the sensing means to be transmitted to the non-reversible input of the comparator 260. Said corrected signal is produced in the following manner: the output signal from the sensing means is first applied to a subtracting network 276 in which the value of the reference voltage is deducted, said signal being then transmitted to an amplifier 277 with adjustable gain in order to adjust the value of the correction. After correction, the signal is then passed to an adding network 278 which adds back to it the value of the reference voltage, then to an inverter 279. At the output of the inverter 279 a signal is subsequently obtained, representing the absolute pressure prevailing in the inlet pipe, which is entirely linear, which signal is transmitted to the non-reversible input of the comparator 260 via the relay 275. As already stated, the comparator 260 supplies a signal, the duration of which corresponds to the time during which the level of the slope of integration exceeds that of the signal from the sensing means for absolute pressure.

When use is made of the sensing means for absolute pressure, the duration of the delay injecton pulse can advantageously be controlled by the circuit 200. The electronic control system 100 can then be simplified by eliminating the monostable 600 and the starter, the input of the decoding circuit 400' connected to the output of the monostable 600 in FIG. 6 then being energized by the output of the circuit 200.

Figure 10:
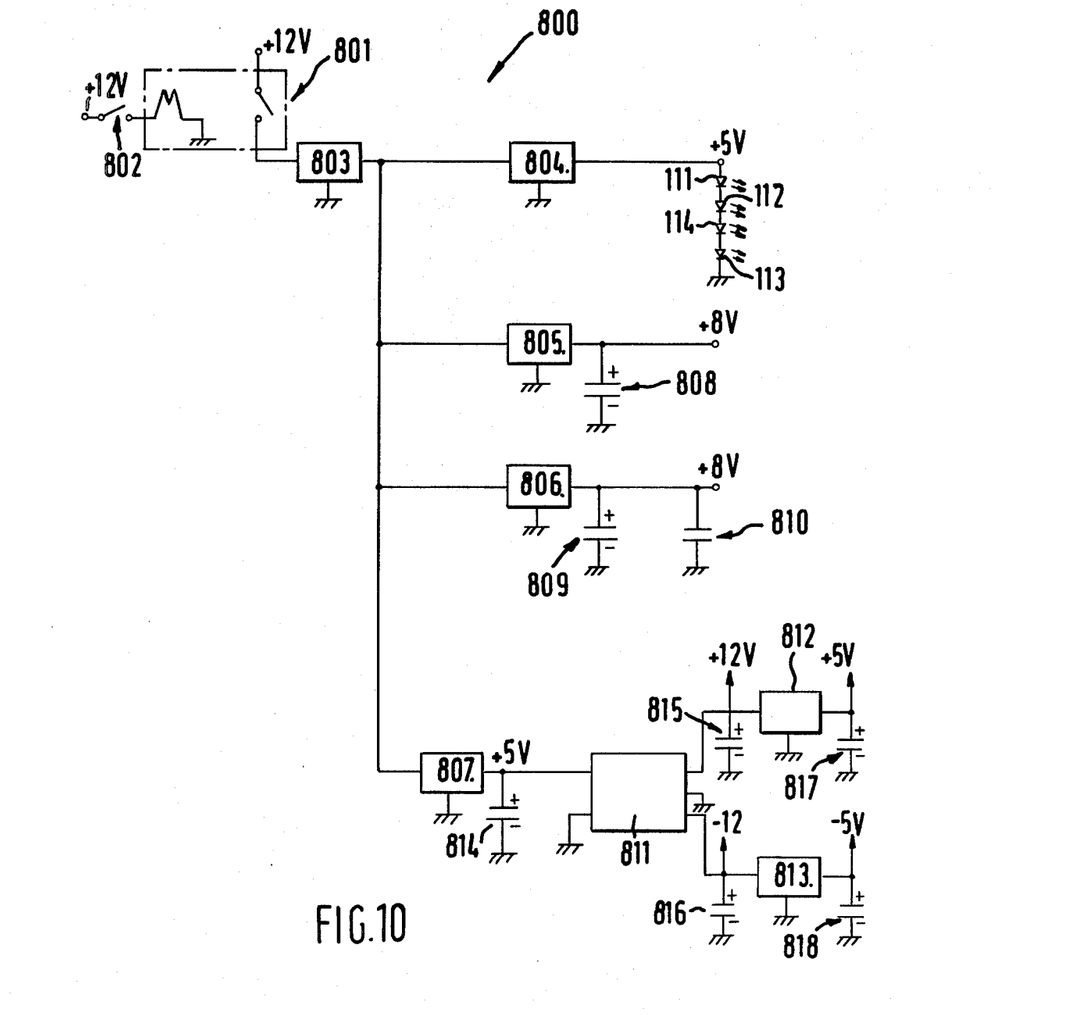
FIG. 10 represents schematically a general scheme of the electronic feeding circuits.

FIG. 10 represents a general scheme of the electronic feeding circuits.

The various electronic circuits and the pump are energized via a relay 801 which is put into operation by means of a switch 802.

A filter 803 connected in series to the contact of the relay 801 eliminates any interference voltage which may reach the battery.

Closure of the contact of the relay 801 causes four integrated circuits or conventional regulators 804, 805, 806, 807, each provided with an internal reference voltage, to be energized. Consequently, each of said regulators supplies a stable and controlled voltage.

The first regulator 804 delivers a 5-volt supply for feeding the above-mentioned four light-emitting diodes 111, 112, 113, 114, intended for emitting radiation in the infrared spectrum.

The second regulator 805 delivers an 8-volt supply for feeding the photocouplers of the starter, of the delay switch and of the injectors. The capacitor 808 of a few hundred μF is advantageously located at the output of the regulator in order to obtain a sufficiently stable voltage.

The third voltage regulator 806 delivers an 8-volt supply for feeding the CMOS integrated circuits. The capacitors 809 and 810 of suitable capacitance are advantageously located at the output of said regulator 806 in order to stabilize the voltage adequately.

The fourth regulator 807 delivers a 5-volt supply for feeding a converter 811, the output terminals of which have voltages of +12 volts and −12 volts with respect to earth. Said voltages of +12 volts and −12 volts feed the various operational amplifiers of the circuit 200 determining the duration of the injection pulse, the switch 219 for triggering and resetting to zero the integrator 215, the potentiometer circuit 240, when use is made of a flow meter with cams, and finally two regulators 812 and 813 connected to the terminals +12 volts and −12 volts respectively, the outputs of which supply voltages of +5 volts and −5 volts respectively for feeding certain operational amplifiers of the circuit 200. Capacitors 814, 815, 816, 817 and 818 of correctly chosen capacitance are connected to the outputs of the regulator 807, of the converter 811 and of the regulators 812 and 813.

Figure 11:
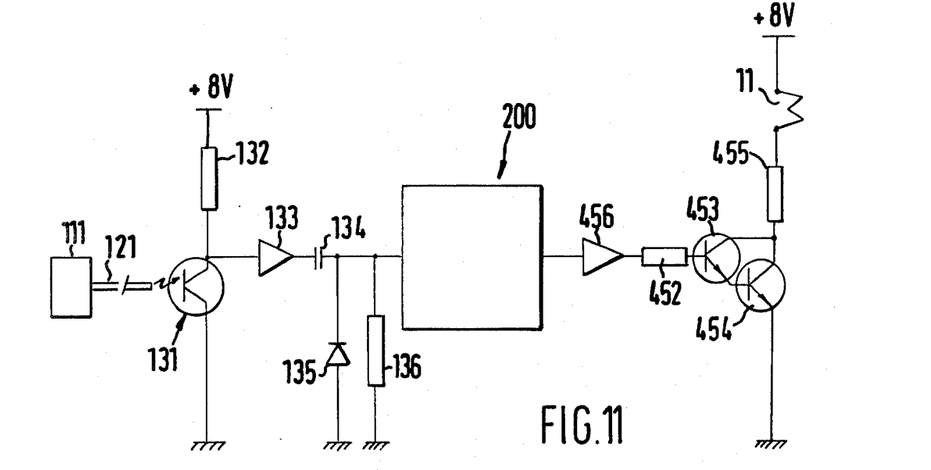
FIG. 11 represents a variant of the embodiment of the injection device of the invention.

In the event of the maximum period during which the injector is energized not exceeding the time interval between two injection control pulses, the injection device of the present invention can be substantially simplified. Such a simplified embodiment is shown in FIG. 11.

It is then no longer necessary to use four injectors upstream of each intake valve, or even two injectors arranged in each of the inlets of the two-cylinder intake chambers. It is then possible to feed the engine with a single injector located upstream of the throttle, like the delay injector 11' described above, and which preferably injects the fuel countercurrently to the air flow. Such an embodiment in particular offers the advantage that the intake manifold need not be interfered with. On the other hand, injection can advantageously be carried out in a pipe provided with a coil for cooling the liquefied petroleum gases used as feed, which device forms a system to prevent in-line vaporization.

A data-collecting device serving the purpose of adapting the beginning and duration of injection to the position of the moving parts and to the rotational speed of the engine, is then incorporated with a single optic fibre 121 which transmits radiation produced by the light-emitting diode 111 to a photo-transistor 131. Assuming that the moving disc, which is provided with the interrupting device, is driven by the camshaft, said moving disc will be equipped with four interrupting tongues 107 in order to ensure that the radiation produced by the light-emitting diode 111 is intercepted four times per revolution of said camshaft. However, if the moving disc is driven by the crankshaft, said moving disc will be equipped with two interrupting tongues 107 in order to ensure that the radiation produced by the light-emitting diode 111 is then intercepted twice per revoulution of the crankshaft. It is obvious that in this case the radiation transmitted to the photo-transistor 131, will be intercepted four times and consequently produce four references per engine cycle. Said four references enable four injections to be made per engine cycle upstream of the throttle, the fuel thus injected penetrating into the appropriate cylinder since the intake valve is open during injection.

On receipt of the radiation transmitted by the optic fibre 121, the photo-transistor 131 is saturated, the saturation current being limited by the current-limiting series resistor 132. The control pulses, which are available at the collector of the photo-transistor and are synchronized with the rotation of the rotating element of the engine, are then transmitted to the input of a buffer amplifier 133, to the output of which a filter network is connected, which network consists of a capacitor 134 and a parallel assembly consisting of a diode 135 and a resistor 136, connected between earth and said capacitor. The pulses filtered in this manner then energize the circuit 200 defined above, which controls the duration of the injection pulse. It is in fact obvious that it is then no longer necessary to use a decoding circuit and a circuit for controlling delay injection, since not more than only one main injector 11 is in operation. The circuit 200 will be constructed according to one of the two designs shown in FIGS. 7 and 8, which correspond to the use of a flow meter with cams or an absolute pressure transducer determining the value of the air intake. The pulses which are available at the output of circuit 200, determining the beginning and duration of each injection, energize a power circuit consisting of two compound-connected transistors 453, 454 via an adapter 456 and a resistor 452. The power transistor 454 becomes conductive when the output of the circuit 200 is in the logical condition 1. The coil of the injector 11 is then fed via a resistor of a few Ohms 455 connected in series to said coil and to the power circuit. The needle of said injector 11 is lifted and the injection takes place.

In order to prevent any freeze-up in the region of the air choke or injector, it will be advantageous to use a thermostat (not shown) for regulating the air temperature.

The present invention is of course not limited to the embodiments just described which enable other forms and embodiments to be envisaged without exceeding the scope of the invention.

We claim:

1. An electronic device for injecting liquefied petroleum gas from a fuel reservoir into combustion chambers of an internal combustion engine, wherein the engine includes an air inlet pipe for providing air to be mixed with the liquid petroleum gas for combustion, comprising:
   fuel injector means for injecting fuel into the combustion chamber of the engine in response to injection control signals;
   control means for forming injection control signals to prescribe the beginning and duration of fuel injection via said injector means, said control means being activated by a first sensing means co-operating with a rotating element driven by the engine and second sensing means for providing an input signal indicative of the air flow in the air inlet pipe;
   fuel-transfer means for providing a continuous circulation of fuel to said injector means from the fuel reservoir, said fuel-transfer means comprising a fuel inlet pipe in fluid communication with said reservoir and said injector means, and a fuel outlet pipe in fluid communication with said inlet pipe and said injector means, said fuel inlet pipe and said fuel outlet pipe being mounted in heat exchange relation at the back of said injector means and wherein said inlet pipe and said outlet pipe are co-axial and concentric;
   said inlet pipe and said outlet pipe forming a closed fuel-transfer circuit with the reservoir to provide continuous circulation of fuel at the back of each injector, thereby avoiding in-line vaporization of the liquid petroleum gas.

2. The device of claim 1, wherein said first sensing means comprises:
   a source of radiation;
   a radiation detector means;
   an optic fibre means for transmitting radiation from said source to said detector means;
   means integral with said rotating element driven by the engine for consecutively interrupting the transmission of radiation from said source to said detector via said optic fibre means.

3. The injection device of claim 1, wherein said second sensing means comprises sensor means for providing a signal indicative of the absolute air pressure in the air inlet pipe.

4. The injection device of claim 3, wherein said control means comprises means for linearizing the response curve of said second sensing means.

5. The injection device of claim 1, wherein said second sensing means comprises:
   flow meter means for sensing the velocity of air in the air inlet pipe; and,
   cam means, associated with said meter means, for calibrating said meter to instantaneous engine speed.

6. The injection device of claim 1, wherein said fuel-transfer means further comprises:
   pressure regulator means for maintaining a constant fuel pressure in said closed fuel-transfer circuit, said regulator means being incorporated downstream of said injector means.

7. The injection device of claim 6, wherein said fuel inlet pipe is mounted co-axially inside said fuel outlet pipe.

8. The injection device of claim 6, wherein said fuel outlet pipe is mounted co-axially inside said fuel inlet pipe.

9. The injection device of claim 1, further comprising:
   hydropneumatic accumulator means, incorporated in said fuel-transfer circuit upstream of said injector means, for providing fuel at substantially constant pressure to said injector means.

10. The injection device of claim 2, wherein said radiation source comprises a light-emitting diode.

11. The injection device of claim 2, wherein said radiation detector means comprises a photo-transistor.

12. The injection device of claim 2, wherein said radiation detection means comprises a photo-diode.

13. The injection device of claim 1, wherein the engine includes a camshaft and said rotating element is integral with the engine camshaft.

14. The injection device of claim 1, wherein the engine includes a crankshaft and said rotating element is integral with the engine crankshaft.

15. The injection device of claim 1, wherein said injector means comprises means for injecting fuel in a direction opposite to the inlet air flow, whereby a substantially homogeneous fuel-air mixture is ensured.

16. The injection device of claim 1, wherein said control means further comprises:
   means for comparing signals indicative of instantaneous engine speed and air inlet flow to prescribed engine speed and air inlet flow data, said data defining a fixed slope integration.

17. The injection device of claim 1, wherein the engine includes a plurality of cylinders and a corresponding plurality of intake valves for admitting a fuel-air mixture to each cylinder, and said injector means comprises a corresponding plurality of fuel injectors, one of said injectors being mounted in proximity of each intake valve for injecting fuel into the intake valve.

18. The injection device of claim 1, wherein the engine includes four cylinders and a first and second intake chambers, the first intake chamber being common to two of the cylinders and the second intake chamber being common to the remaining two cylinders, and wherein said injector means comprises:

a first fuel injector mounted in fluid communication with the first intake chamber; and a second fuel injector mounted in fluid communication with the second intake chamber.

19. The injection device of claims 17 or 18, wherein said closed fuel-transfer circuit includes a throttle for controlling engine speed, and said injector means further comprises:

delay injector means incorporated in said fuel-transfer circuit upstream of the engine throttle.

20. The injection device of claim 1, wherein said closed fuel-transfer circuit includes a throttle for controlling engine speed, and said injector means comprises a single fuel injector incorporated in said fuel-transfer circuit upstream of the engine throttle.

21. The injection device of claim 2, wherein said closed fuel-transfer circuit includes a throttle for controlling engine speed, and said injector means comprises a single fuel injector incorporated in said fuel-transfer circuit upstream of the engine throttle.

22. The injection device of claim 21, wherein said optic fibre means comprises a single optic fibre for transmitting radiation from said source to said detector.

23. The injection device of claim 2, wherein said optic fibre means comprises:

an annular support member surrounding said rotating element;

four optic fibres mounted equiangularly about the circumference of said support member.

* * * * *